UNITED STATES PATENT OFFICE.

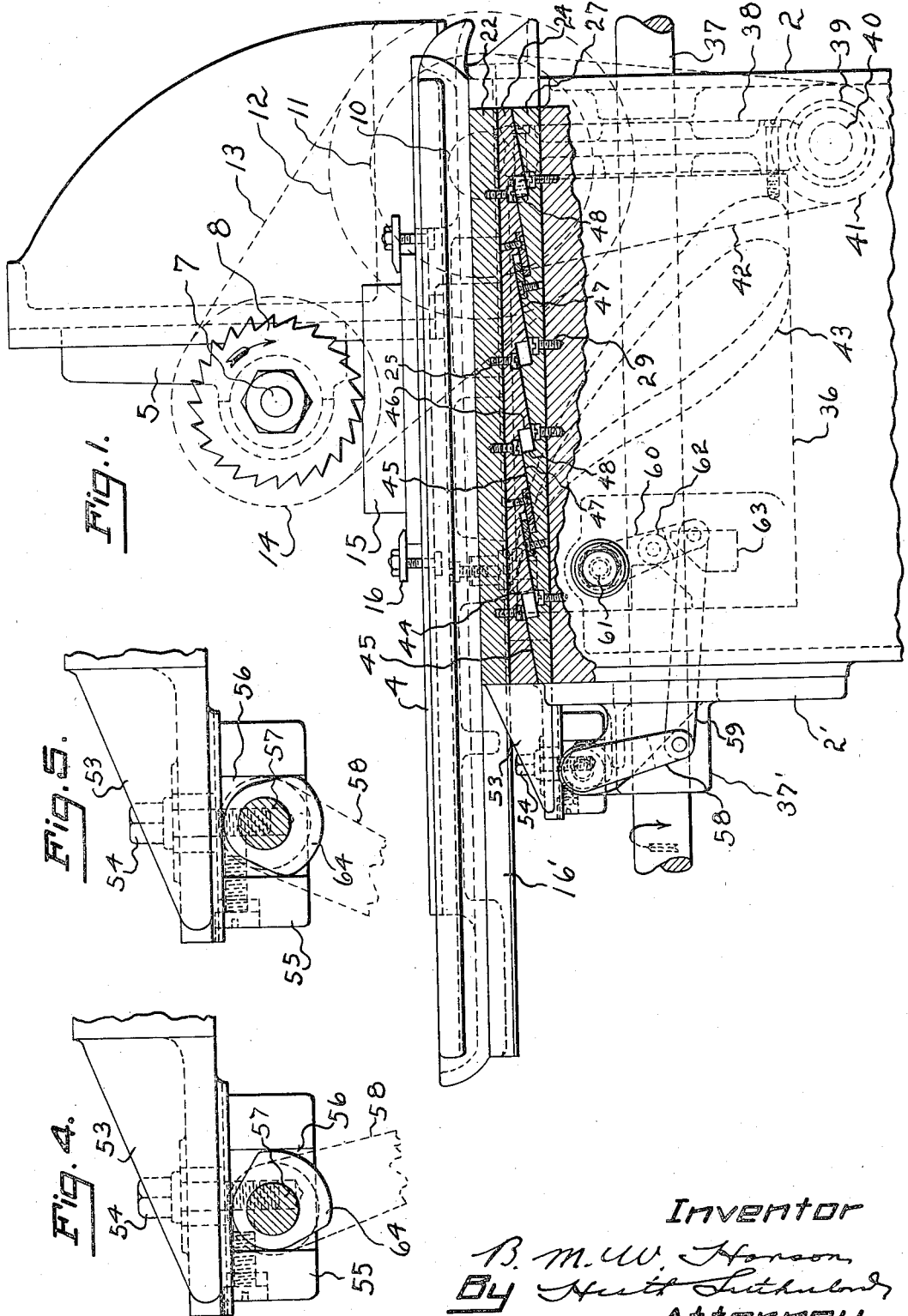

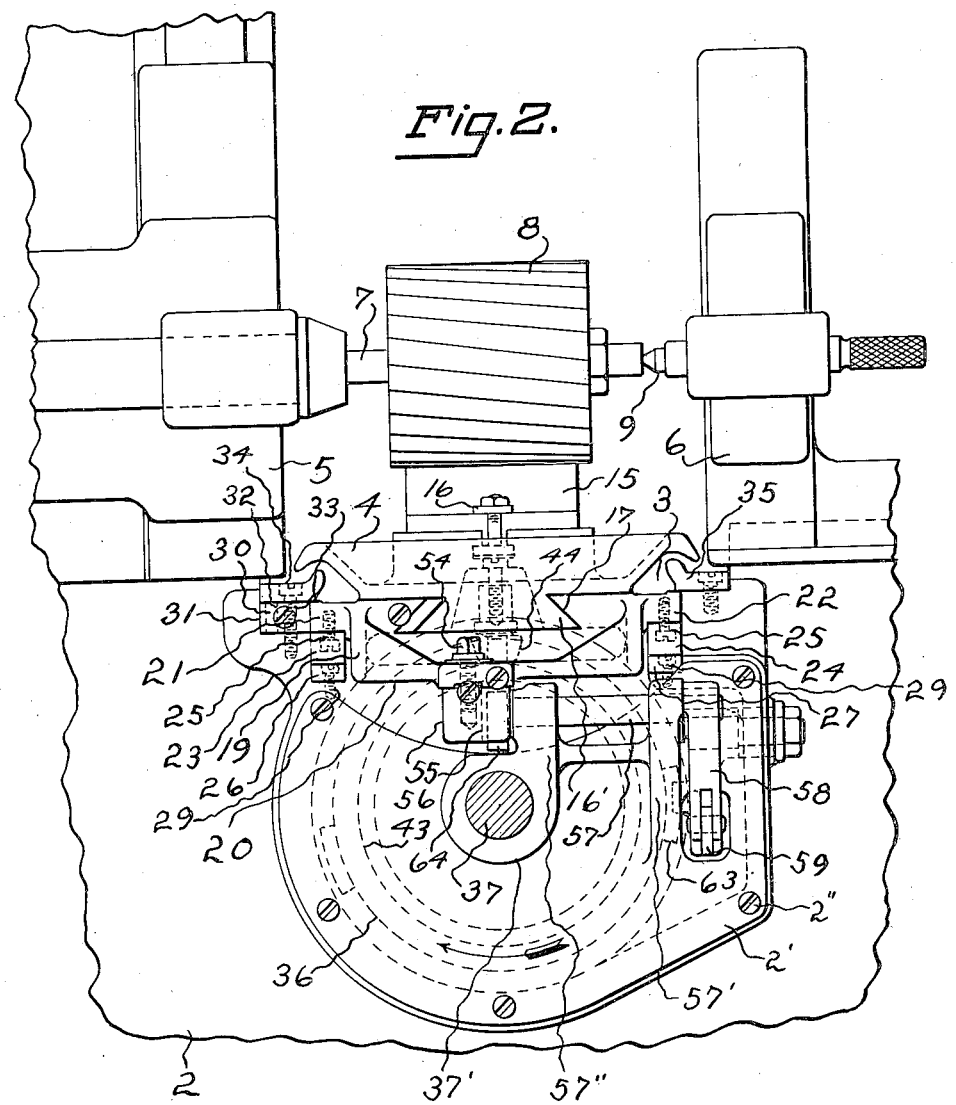

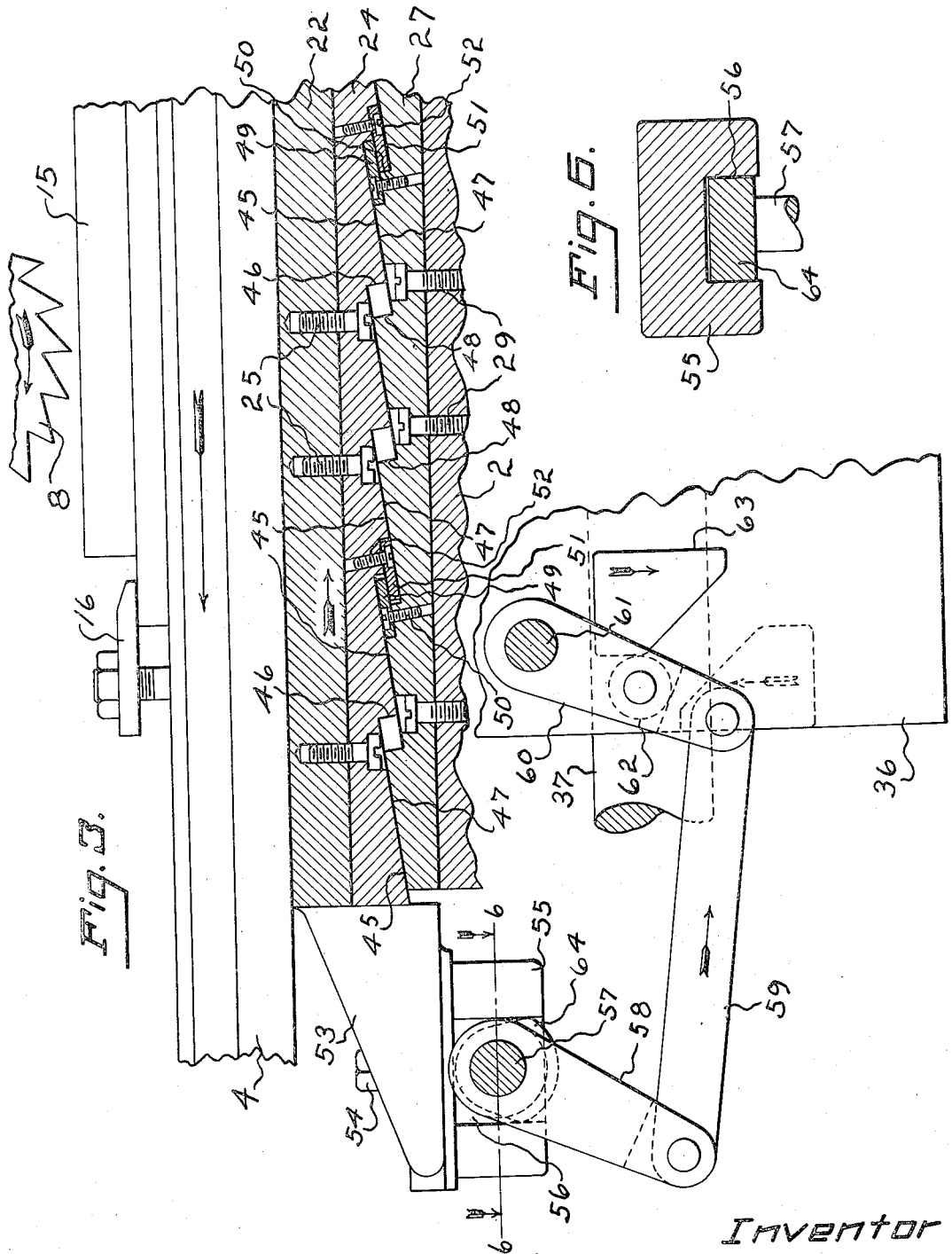

BENGT M. W. HANSON, OF HARTFORD, CONNECTICUT.

METAL-WORKING MACHINE.

1,295,157.  Specification of Letters Patent.  Patented Feb. 25, 1919.

Application filed November 30, 1917. Serial No. 204,490.

*To all whom it may concern:*

Be it known that I, BENGT M. W. HANSON, a citizen of the United States, residing at Hartford, in the county of Hartford and State of Connecticut, have invented certain new and useful Improvements in Metal-Working Machines, of which the following is a specification.

This invention relates to metal-working machines. It is old in this art as in milling, to provide a traveling reciprocatory carrier which sustains the work, in combination with a cutter to operate upon the work during a predetermined movement of the carrier and to cause the separation of the work and the carrier practically at the conclusion of the cut and to maintain this relation during the retractive or return movement of the carrier, and this without stopping the reciprocation of the carrier or the rotation of the tool or cutter, so that as a result the cutter will not injure the work on said return movement. The primary purpose I have in view is to provide a construction involving this elemental feature and which possesses the maximum of strength and by which also precise results are secured, both features of fundamental importance.

In the drawings accompanying and forming part of the present specification I have shown in detail a form of embodiment of the invention which I will fully set forth in the following description. I am in no sense restricted to this particular disclosure; I may depart therefrom in several respects within the scope of the invention defined by the claims following said description.

Referring to said drawings:

Figure 1 is a side elevation partly in section of a milling-machine involving the invention.

Fig. 2 is an end elevation of the same as seen from the left in Fig. 1.

Fig. 3 is a detail sectional side elevation of the carrier, a part of the cutter, a portion of the drum and certain coöperating elements.

Figs. 4 and 5 are details of a part of the slide and cam with certain other elements showing the parts in two different positions.
Fig. 6 is a horizontal section on the line 6—6 of Fig. 3.

Like characters refer to like parts throughout the several figures of the drawings which are on different scales.
As will be inferred the improvement can with advantage be incorporated in different kinds of metal-working machines. It has been found of particular utility when embodied, however, in a milling-machine, being so represented in the drawings. As I have practically noted it is old in the milling machine art to provide a carrier to which work is suitably connected for operation by a milling cutter or equivalent tool and to cause a relative movement of the work and the tool, so that the work or that portion at least thereof which is to be operated upon will be caused to cross the cutting plane, whereby on the advance of the carrier, generally consisting of a slide, the tool or cutter can make the necessary cut or other dressing operation. At the conclusion of the cut the work is caused to return across this cutting plane, so that on the back movement of the carrier, the tool cannot mar or deface the work. I provide a construction embodying these several characteristics, and this meets my conditions in a highly satisfactory manner.

The framework for sustaining the different parts of the machine may be of any suitable nature. That shown comprises a base or bed as 2 having a groove or channel as 3 in its top to receive the traveling carrier 4, which although it consists of a slide is not as is usual guided by ways on the frame. The carriage and parts coöperative therewith will be hereinafter more particularly described.

The bearings 5 and 6 quite common in this type of machine rise from the upper side of the bed 2, the bearing 5 being equipped with a spindle 7 to which a milling cutter as 8 is attached. The spindle in turn receives the center 9 on the bearing 6. This as will be understood is quite common in milling-machines and is as a result but briefly described. The bed or base 2 supports a main shaft as 10 driven in some convenient manner as by the pulley 11. To the shaft 10 is fastened in turn the pulley 12 connected by a belt 13 to the pulley 14 fixed to the spindle 7, the result being that when the pulley 11 is rotated, the spindle 7 and hence the cutter 8 will be turned through the intermediate described parts. This is only one of a large number of different ways for securing the necessary action of the cutter, which is preferably continuously rotative or at least should be rotated during each full reciprocation of the work-carrier.

The work is designated by 15 and is held to the carrier 4 in any desirable manner as by the clamping devices 16. In the construction shown the work carrier or slide moves on its advance toward the right in Fig. 1 at which time the cutter 8 turning in the direction of the arrow applied thereto in said view, will be operating upon the upper side of the work. When the cut is concluded the work will be caused to recede or drop across the cutting plane, so that on the backward movement of the carriage or when it travels toward the left in said Fig. 1, the work will be entirely free of the cutter and can in nowise be marred thereby or be affected by any mass of chips that may bank up on the work.

The carrier or slide 4 has on its under side the gib 16' mounted in the gibway 17 of the support 19. Said support 19 has at what might be considered the front, a connecting piece 20, the support as a result being practically of yoke or U-form. Said support as will hereinafter appear is intermittently moved in an endwise or longitudinal direction to effect elevation and lowering in proper sequence of the slide 4. Said support is provided with the lateral flanges or projections 21 and 22 which have fastened to their under sides the strips 23 and 24, the screws 25 being shown as a convenient way of securing the strips to the lateral flanges. These strips 23 and 24 in turn surmount the rails 26 and 27 for instance as best shown in Fig. 2 and also in Fig. 1, the rails 26 and 27 being secured in notches in the groove or channel 3 of the bed for example by screws 29. The strips 23 and 24 as I will hereinafter explain coöperate in a peculiar manner with the stationary or fixed rails 26 and 27, the pairs of rails and strips being situated at opposite sides of the body of the support 19. The side face of the flange 22 it will be seen on inspection of Fig. 2 for instance, engages flatwise against the frame 2, while the complemental flat surface of the flange 21 engages the adjacent flat surface of the strip 30 set in the rabbet 31 in the upper portion of the groove or channel and which is adjustable to compensate for wear. The lateral adjustment may be secured in any desirable way; for instance the strip 30 may have several transverse elongated slots 32 to receive the screws 33 threaded into the base 2 and extending through the gib 34. This gib it will be seen overlies the projection 21, the companion gib 35 being fastened to the bed 2 and overlying the flange 22.

It will be understood that the carrier or slide 4 moves longitudinally or endwise on the support 19. It will also be understood that if the support be raised the slide will be similarly raised, a like observation applying on the lowering of the support. The means for reciprocating the slide on the support may vary within limits. For this purpose I have shown the drum 36 fastened to the shaft 37 (Fig. 1) carried by suitable bearings on the bed 2. As shown the shaft 37 is provided with a worm gear 38 in mesh with the worm 39 on the shaft 40 also supported by bearings on said base or bed. The shaft 40 in addition to rigidly carrying the worm 39 is equipped with a pulley 41 connected by the belt 42 with the pulley 11 hereinbefore described. The drum 36 has a race 43 which receives the stud or anti-friction roller 44 depending from the carrier or slide 4. The shaft 37 is rotated in the direction of the arrow applied thereto and on its turning rotates the drum 36 therewith, the race 43 through its coöperation with the stud or antifriction roller giving to the carrier or slide 4 a full reciprocation of each complete rotation of the drum. That is to say the carrier or slide is moved from its extreme back to its extreme forward position and is then returned to its primary position on each complete rotation of the drum. As I will hereinafter point out the carrier or slide and hence the work 15, is lifted or elevated before the cutter 8 acts upon the work 15, the upper side of the work when in its upper position being at this time above what I have considered the cutting plane. In consequence of this condition the cutter can mill the work, being shown in such act in Fig. 1, turning in the direction of the arrow applied thereto in the view identified. The carrier or slide will advance beyond the position it is shown as occupying in said figure, and at the conclusion of the cut or thereafter, in the present case practically when the advance movement is completed, the carrier or slide will be lowered and will be continued in the lowered position during virtually the complete retractive or backward movement. The result of this is that the work 15 cannot be struck by the cutter on the back stroke. In the present case at about the commencement of the forward or advance stroke, the carrier or slide is elevated and is maintained in said relation during substantially the complete forward movement. As will be inferred I have described in part the mechanism by which the elevation and depression of the carrier or slide are secured in proper order.

I have referred to the fact that the support 19 has lateral flanges or projections 21 and 22, to which are fastened strips 23 and 24, coöperative with the rails 26 and 27. I have shown in detail in Fig. 1, one flange as 22, the coöperating strip 24 and the rail 27. This structure I will set forth more fully, the description, of course, applying to the set of parts on the other side of the machine. The strip 24 has on its under side a succession of angular surfaces 45 connected by the faces 46, these angular surfaces 45 coöperating with practically similar surfaces 47 connected by the faces 48, the angular faces 45 resting on the angular faces 47. I may, if desired, countersink in one or more of the faces 47 wear plates as 49, held in place as by screws 50. I may also countersink in the angular faces similar plates as 51 likewise held in position as by screws 52, the two series of wear plates coöperating in pairs as shown. There are only two pairs of such wear plates illustrated, and they meet my requirements. I may provide a larger number or may omit them entirely. The angular faces 47 as will be understood present in effect a part of the support 19 to which I have already referred. It will be clear that if said part 19 be moved to the right for instance in Fig. 1, the carrier or slide 4 will be elevated owing to the fact that the angular faces 45 are caused to ride up the angular faces 47. By moving the carrier or slide to the left in said Fig. 1, the reverse action follows, for the carrier will be caused to lower or until the walls 46 nearly abut against the end walls 48. I have described the fact that there are wear plates as 49 and 51. It will be perceived that owing to the fact that these plates are countersunk in position the plates on the rail 27 overhang the plates of the strips 24, the result being that the strips and rails are interlocked against vertical movement, the interlock being maintained throughout the complete relative sliding movement of the parts 23 and 26. Owing to this condition the support 19 cannot be accidentally vertically displaced.

The support 19 as shown is furnished with a bracket 53 to which is bolted or otherwise secured as at 54 the block 55 having a notch 56 which receives the rock shaft 57. Said rock shaft is supported by connected bearings 57' and 57" on the plate 2' fastened as by screws 2" to the base or bed 2. The bearing 57" has a hub 37' to support the cam shaft 37. To the rock shaft 57 is rigidly united the arm 58 connected as by the link 59 with the rock arm 60, the rock shaft 61 carrying which is supported within the base or bed 2. This rock arm 60 is furnished with a stud as 62 coöperative with a cam as 63 united to the periphery of the cam drum 36. The shaft 57 to which I have already referred has fixed to it the cam 64 mounted in the notch or slot 56. It will, of course, be understood that there is wedge means which acts in the construction shown, to cause the raising and lowering of a support as 19 and therefore causes corresponding movements of a carrier as the slide 4, at predetermined points in the reciprocation of said carrier or slide.

It will be assumed that a cut has been made and that the carrier or slide 3 is being given its return movement through the action of the cam drum 36 in the manner already described. During this motion the carrier follows the direction of the arrow applied thereto in Fig. 3. It will be understood that just before the commencement of the return movement the cam 63 acted against the stud or anti-friction roller 62 when following the course of the arrow applied thereto in full lines, to move said arm 60, link 59 and arm 58 to the positions they are shown as occupying in said view, the support 19 which sustains the slide being of course in its lowest position. Approximately at the time the return or backward movement of the slide 4 is completed, the cam 63 following the course shown by the dotted lines and dotted arrow applied thereto, will as the cam 36 rotates, strike the stud or roller 62 so that on the continued movement of the cam drum 36, the cam 63' will swing the arm 60 to the right in Fig. 3 by the engagement of the cam 63 with the stud 62. This results in drawing the link 59 to the right as indicated by the arrow applied thereto, the arm 58 being similarly swung to the right so that the cam 64 will engage the right face of the wall or slot 56 and thus swing the support 19 to the right in Fig. 3. During this movement the inclined faces 45 travel along the inclined faces 47, thus lifting the support 19, the carriage 4 and hence the work 15. This action as will be understood, occurs before the work reaches the cutter and preferably at about the conclusion of the backward stroke of the carrier. When the work is in its elevated position, the cutter 8 can mill or otherwise act upon it. At the conclusion of the cut, the cam 63 will strike the stud 62 and will operate the arm 60, link 59 and arm 58 in a direction reverse to that already described, the result being that the surfaces 45 will ride down the relatively fixed surfaces 47 and result in the lowering of the carrier 4, in view of which circumstance the work 15 will be carried below the cutting plane and will not come in contact with the teeth or other parts of the cutter.

I might explain that the cam 64 is intermittently rocked. It is moved to the right through the means described when the carrier 4 has practically concluded its retractive movement. As a result the effective portion of the cam can engage the right face (Figs. 4 and 5 for example) of the slot 56 to cause the raising of the support 19 and consequent elevation of the slide or carrier. When the advance movement is completed the cam 64 is oppositely swung so as to engage the left wall of the slot 56 and thus move the carrier 19 to the left to lower the carrier. The cam will remain in contact with the side faces of the slot until the respective strokes are practically completed.

It will be apparent that the bed or equivalent member of the framing or analogous part receives a support on which a slide is mounted and in conjunction with these or practically similar parts I associate therewith means for causing the movement of the support and therefore of the slide in a straight direction transverse to the line of traveling movement of the slide. In the present instance this transverse movement is practically at right angles to the line of traveling movement of the slide, there being in connection with the support and slide, means for maintaining the latter in proper guide relation with the former while being reciprocated.

What I claim is:

1. The combination of a slide, a support on which said slide travels for reciprocation, and means for causing the movement of the support and therefore of the slide in a straight direction at right angles to the line of traveling movement of the slide.

2. The combination of a support, a slide on said support, mechanism for advancing and retracting the slide on the support, a frame member on which said support is mounted, and means for moving the support in a straight direction at right angles to the line of travel of the slide at predetermined points in the movement of the slide to thus cause the movement of both the support and the slide thereon away from and then toward the frame member.

3. The combination of a slide, a support having ways to receive said slide for reciprocatory traveling movement, framing on which the support is mounted, means to support a cutting tool to operate on the work on the slide, and means for causing the movement of the support and therefore of the slide in a straight direction at right angles to the line of movement of the slide to first carry the support and the slide into position to permit the tool to act upon the work on the slide and subsequently to free the work.

4. The combination of a support, a slide having a guide connection with the support, automatic means for reciprocating the slide on the support, and automatic means for causing the movement of the support and therefore of the slide in a straight direction approximately at right angles to the line of traveling movement of the slide first one way and afterward the opposite way.

5. The combination of a support, a slide having a guide connection with the support, means for reciprocating the slide on the support, and means for causing the successive elevation and lowering of the support and therefore of the slide in a direction at right angles to the line of traveling movement of the slide, and means for supporting a tool in position to operate on the work sustained by the slide when in its elevated position.

6. The combination of a support, a carrier on the support, a rotary cam member provided with means for reciprocating the carrier on the support, and means actuated by said rotary cam member for causing the raising and the lowering of the support at predetermined points in the movement of the carrier to correspondingly raise and lower said carrier.

7. The combination of a support, a carrier on the support, mechanism for advancing and retracting the carrier on the support, the support having a plurality of series of inclined faces, elements having a corresponding plurality of series of inclined faces engaging the other series of faces, and means for imparting a relative movement to said two series of inclined faces in opposite directions to cause the raising and lowering of the support and corresponding movements of the carrier.

8. The combination of a support, a carrier on the support, mechanism for advancing and retracting the carrier on the support, the support having a plurality of series of inclined faces, elements having a corresponding plurality of series of inclined faces engaging the other series of faces, and means for imparting movements to the support to cause the raising and lowering of the same and thus corresponding movements of the carrier.

9. The combination of a support, a slide on the support, mechanism for advancing and retracting the slide on the support, the support having a plurality of laterally separated series of inclined faces, elements having a corresponding plurality of laterally separated series of inclined faces engaging the other series of faces, and means for imparting movements to the support in opposite directions to cause raising and lowering of the same and corresponding movements of the slide.

10. The combination of a support, a carrier on the support, a rotary member provided with means for reciprocating the carrier on the support, a cam, means operative by the rotary member for actuating the cam, and means actuated by the cam to impart raising and lowering movements to the support and the support correspondingly operating the carrier.

11. The combination of a support, a carrier, a support for the carrier in the form of a yoke, mechanism for advancing and retracting the carrier on the support, and means operating against the transverse portion of the yoke to effect raising and lowering of the same at predetermined points in the movement of the carrier to correspondingly raise and lower the carrier.

12. The combination of a support having lateral flanges having strips fastened to their under side, laterally separated rails on which the strips are mounted, the strips and rails having corresponding series of inclined faces, and means for causing the endwise movement of the support to thereby effect through the engaging faces raising and lowering of the support and corresponding movements of the carrier at predetermined points in the travel thereof.

13. The combination of a support, a carrier on the support, mechanism for advancing and retracting the carrier on the support, and means between the framing of the machine and the support for causing the raising and lowering of the support at predetermined points in the movement of the carrier to correspondingly raise and lower said carrier at right angles to the line of the advancing and retracting movements of the carrier.

14. The combination of a support, a carrier on the support, mechanism for advancing and retracting the carrier on the support, the support having a series of inclined faces, elements having a corresponding plurality of series of inclined faces engaging the other series of faces, plates fastened to the respective inclined faces and overlying each other, and means for imparting a relative movement to said series of inclined faces in opposite directions to cause the raising and lowering of the support and corresponding movements of the carrier.

15. The combination of a support, a carrier on the support, mechanism for advancing and retracting the carrier on the support, the support having inclined face means, an element also having inclined face means engaging the inclined face portion of the other inclined face means, and means for imparting a relative movement to said two inclined face means in opposite directions to cause the movement of the support and a corresponding movement of the carrier first in one direction and then in the other.

16. A milling machine comprising a frame, a slide, mechanism between the slide and the frame, supported by the frame, the slide being reciprocatory with respect to said mechanism, and means for causing opposite movements of said mechanism and thus opposite movements of the slide in a straight direction and at right angles to the line of reciprocatory movement of the slide at predetermined points in the reciprocation of said slide.

17. A milling machine comprising a frame, a slide, an element between the slide and the frame supported by the frame, the slide being reciprocatory with respect to said element, wedge means, and means for causing the operation of said wedge means and through said wedge means, opposite movements of said element and thus opposite movements of the slide in a straight direction and at right angles to the line of reciprocatory movement of the slide at predetermined points in the reciprocation of said slide.

18. A milling machine comprising a frame, a slide, an element between the slide and the frame, supported by the frame, the slide being reciprocatory with respect to said element, and power-operatable means for causing opposite movements of said element and thus opposite movements of slide in a straight direction, at right angles to the line of reciprocatory movement of the slide at predetermined points in the reciprocation of said slide.

19. A milling machine comprising a frame, a slide and mechanism between the frame and the slide, supported by the frame and in turn supporting the slide for reciprocation and means for causing opposite movements of said mechanism and thus opposite movement of the slide in a straight direction and at right angles to the line of reciprocatory movement of the slide at predetermined points in the reciprocation of said slide.

In testimony whereof I affix my signature in the presence of two witnesses.

BENGT M. W. HANSON.

Witnesses:
W. H. PENFIELD,
H. E. BAILEY.